(12) United States Patent
Christoff et al.

(10) Patent No.: US 10,052,928 B2
(45) Date of Patent: Aug. 21, 2018

(54) RIDE HEIGHT CONTROL ACTUATOR

(71) Applicant: GM GLOBAL TECHNOLOGY OPERATIONS LLC, Detroit, MI (US)

(72) Inventors: Brian D. Christoff, Ann Arbor, MI (US); John K. Dagg, Shelby Township, MI (US); Robert G. Izak, Dryden, MI (US); Christian E. Thomas, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 216 days.

(21) Appl. No.: 15/093,061

(22) Filed: Apr. 7, 2016

(65) Prior Publication Data
US 2017/0291465 A1  Oct. 12, 2017

(51) Int. Cl.
*B60G 17/04* (2006.01)
*B60G 15/10* (2006.01)

(52) U.S. Cl.
CPC ........ *B60G 17/0416* (2013.01); *B60G 15/10* (2013.01); *B60G 2202/416* (2013.01); *B60G 2400/95* (2013.01); *B60G 2500/30* (2013.01)

(58) Field of Classification Search
CPC .. B60G 17/015; B60G 17/0416; B60G 17/00; B60G 15/10; B60G 2202/416; B60G 2500/30; B60G 2400/95
See application file for complete search history.

(56) References Cited

U.S. PATENT DOCUMENTS

| | | | | |
|---|---|---|---|---|
| 3,222,047 | A * | 12/1965 | Tuczek | B60G 17/04 267/64.19 |
| 3,584,541 | A * | 6/1971 | Cunningham | B60G 17/0272 91/468 |
| 6,389,341 | B1 * | 5/2002 | Davis | B60G 17/0152 188/266.5 |
| 7,770,902 | B1 * | 8/2010 | Davis | B60G 3/145 180/9.5 |
| 8,702,109 | B2 * | 4/2014 | Ryan | B60G 17/021 280/5.514 |
| 8,839,920 | B2 * | 9/2014 | Anderson | B60G 13/14 180/165 |
| 9,643,466 | B1 * | 5/2017 | Christoff | B60G 17/005 |
| 9,809,080 | B2 * | 11/2017 | Ellifson | B60G 17/08 |
| 9,855,814 | B2 * | 1/2018 | Tucker | B60G 17/08 |
| 2007/0080001 | A1 * | 4/2007 | Beck | B60K 7/0007 180/24.07 |
| 2015/0290992 | A1 * | 10/2015 | Mochizuki | B60G 15/062 280/5.514 |

(Continued)

*Primary Examiner* — Karen Beck
(74) *Attorney, Agent, or Firm* — Quinn IP Law

(57) ABSTRACT

An actuator includes a first housing, a second housing fixed to the first housing, and a piston configured to translate relative to each of the first housing and the second housing. The actuator also includes a locking device configured to selectively restrain the piston in a predetermined position relative to each of the first housing and the second housing and release the piston. The actuator additionally includes an actuation mechanism configured to activate the locking device to thereby restrain the piston in the predetermined position. Also disclosed is a suspension system for a vehicle employing such an actuator at a suspension corner, wherein the actuator is used to set a ride height of the vehicle at the suspension corner.

18 Claims, 7 Drawing Sheets

(56) References Cited

U.S. PATENT DOCUMENTS

2016/0221410 A1* 8/2016 Mersmann ........... B60G 17/021
2017/0137023 A1* 5/2017 Anderson ............. B60W 30/02
2017/0282669 A1* 10/2017 Cox .................... B60G 17/021

* cited by examiner

RIDE HEIGHT CONTROL ACTUATOR

TECHNICAL FIELD

The present disclosure relates to a ride height control actuator for an adjustable vehicle suspension.

BACKGROUND

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced operator control, while a suspension for a luxury vehicle may be tuned for the opposite outcome.

The vehicle's intended purpose, along with the specific design of its suspension, also influences the set height of the vehicle's body relative to the road surface. In order to accommodate various, and at times conflicting, vehicle objectives, adjustable vehicle ride height suspensions have become more popular.

SUMMARY

An actuator includes a first housing, a second housing fixed to the first housing, and a piston configured to translate relative to each of the first housing and the second housing. The actuator also includes a locking device configured to selectively restrain the piston in a predetermined position relative to each of the first housing and the second housing and release the piston. The actuator additionally includes an actuation mechanism configured to activate the locking device to thereby restrain the piston in the predetermined position.

The piston may include a recess, and the locking device may include a split collar having a first half-collar and a second half-collar. Each of the first and second half-collars may be configured to engage a recess on the piston of the actuator.

The actuation mechanism may include a first solenoid and a second solenoid. Each solenoid may be configured to extend the respective first half-collar and the second half-collar into the recess to thereby restrain the piston in the predetermined position. Each solenoid may also be configured to retract from the respective first half-collar and the second half-collar to release the piston.

The actuator may include at least one elastic element configured to facilitate retraction of the first and second half-collars out of the recess to thereby release the piston.

The first solenoid and the second solenoid may each be mounted on the second housing of the actuator.

Each of the first solenoid and the second solenoid may extend through the first housing.

The second housing may include a first element configured to fluidly seal the second housing to the piston.

The actuator may include a sleeve disposed inside the piston, and the first housing may include a second element configured to fluidly seal the first housing to the sleeve.

The sleeve may be configured to guide the piston relative to the first housing and the second housing.

The first housing may include a pocket configured to accept the piston and the piston may be configured to slide within the pocket.

The predetermined position of the piston may be an intermediate position between minimum and maximum travel of the piston within the pocket.

Also disclosed is a suspension system for a vehicle employing such an actuator at a suspension corner, wherein the actuator is used to set a ride height of the vehicle at the suspension corner.

Such a vehicle may include a sensor configured to detect the height of the vehicle body relative to a road surface at the suspension corner.

The vehicle may also include a controller configured to receive the signal indicative of the height of the vehicle body and regulate the actuation mechanism to selectively restrain the piston in the predetermined position and release the piston via the locking device.

In such a vehicle, the predetermined position of the piston may define an intermediate height of the vehicle body relative to the road surface at the suspension corner.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
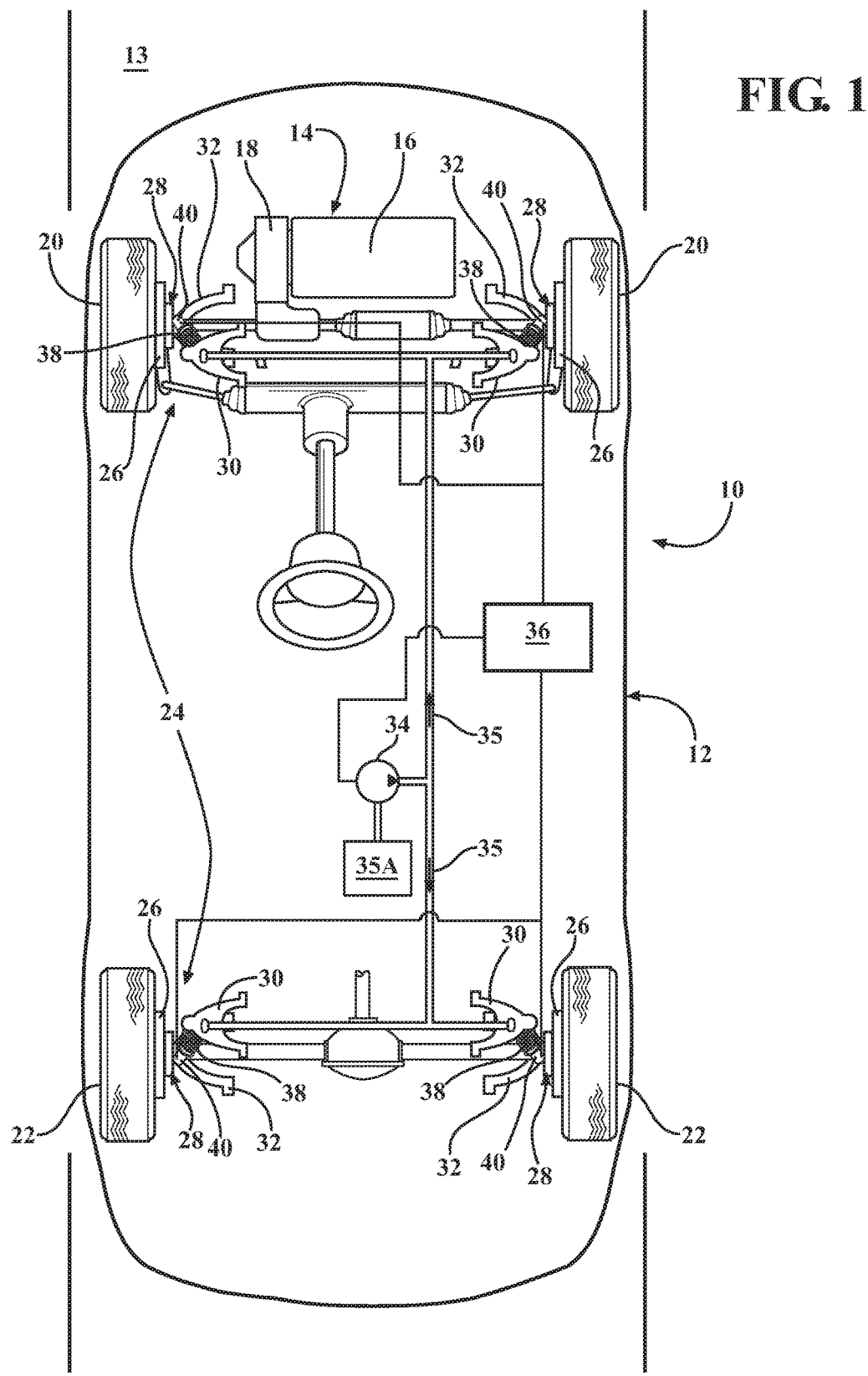
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

Figure 2:
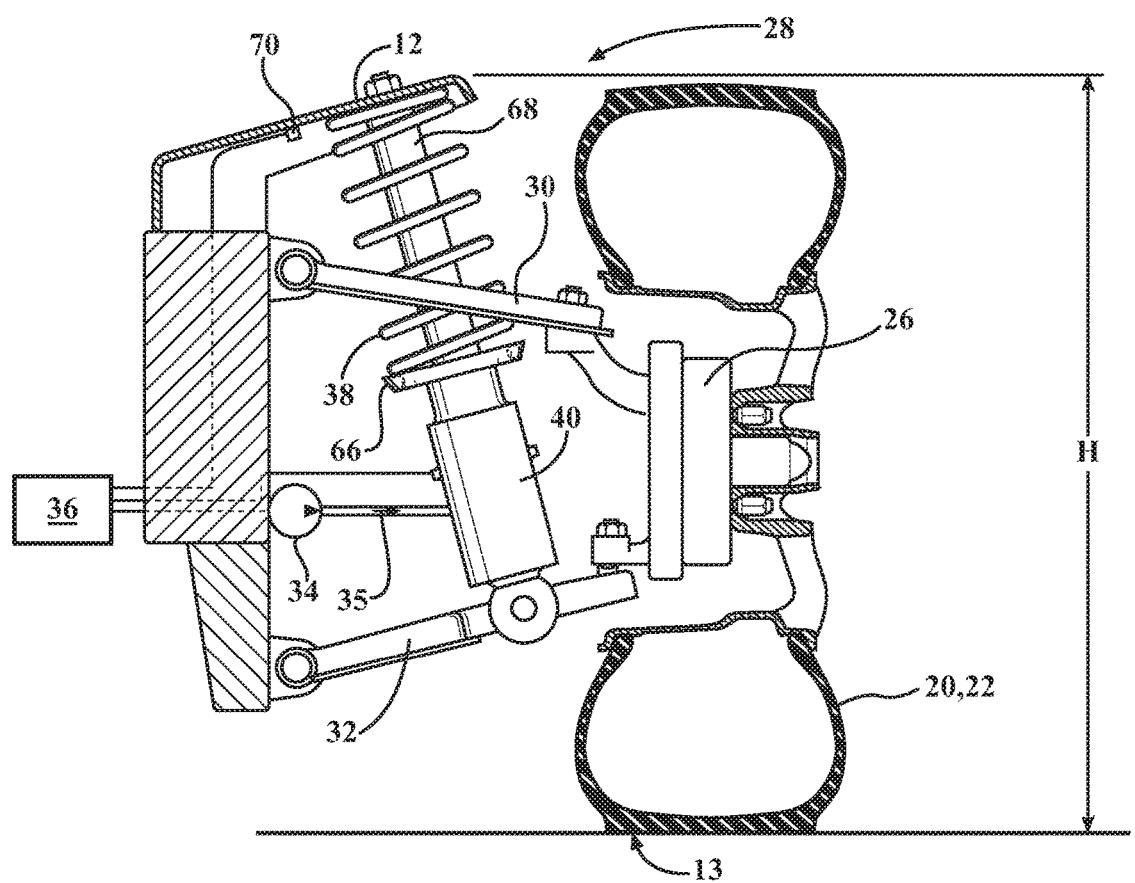
FIG. 2 is an enlarged schematic cross-sectional illustration of a representative suspension corner of the vehicle shown in FIG. 1, having a spring, a damper, and an actuator according to the disclosure.
Figure 3:
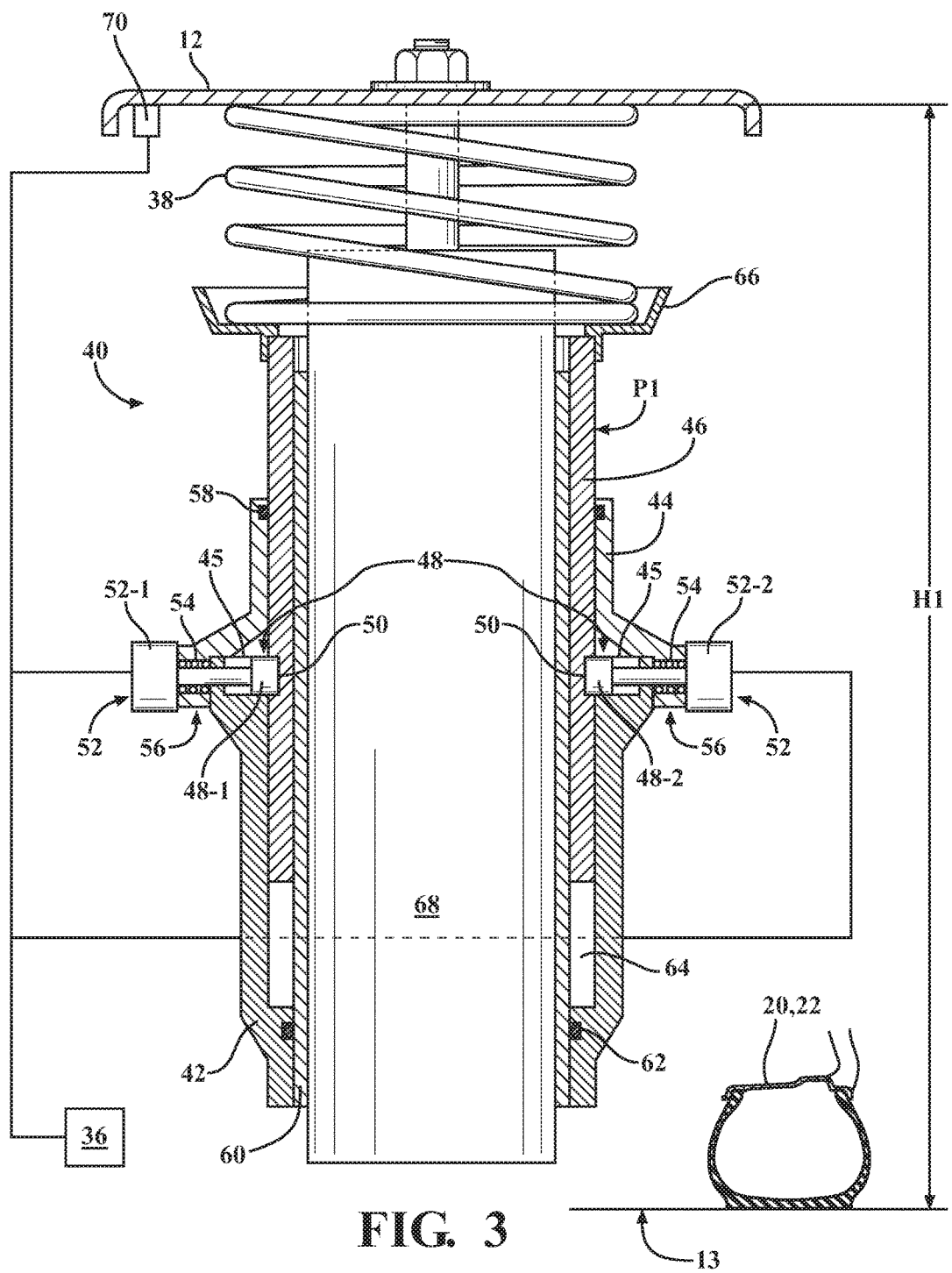
FIG. 3 is a schematic not to scale illustration of the suspension corner shown in FIG. 2, wherein the actuator is shown in an intermediate position and a locked state.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32. FIGS. 2-3 depict a representative corner 28 of the suspension system 24, which includes a representative knuckle 26.

As shown in the FIGS. 2-3, at each individual suspension corner 28 the vehicle body 12 is characterized by a specific height H relative to the road surface 13, i.e., vehicle ride height. The suspension system 24 includes a fluid pump 34 configured to supply a pressurized fluid 35 from a reservoir 35A. Additionally, the suspension system 24 includes an electronic controller 36. According to the disclosure, the controller 36 is configured to regulate operation of the pump 34, and may be a vehicle body controller configured to operate other systems of the vehicle 10, such as the braking and stability control systems, which are not specifically shown, but understood by those skilled in the art. Accordingly, the controller 36 is in electrical communication with the fluid pump 34 and various sensors in order to facilitate regulation of the vehicle suspension system 24 in real time, as discussed in detail below. In order to appropriately control operation of the suspension system 24, the controller 36 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 36 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 36 may also include a floppy disk, a flexible disk, hard disk, magnetic tape, any other magnetic medium, a CD-ROM, DVD, any other optical medium, etc. The controller 36 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 36 or accessible thereby may be stored in the memory and automatically executed to provide the required functionality.

Figure 4:
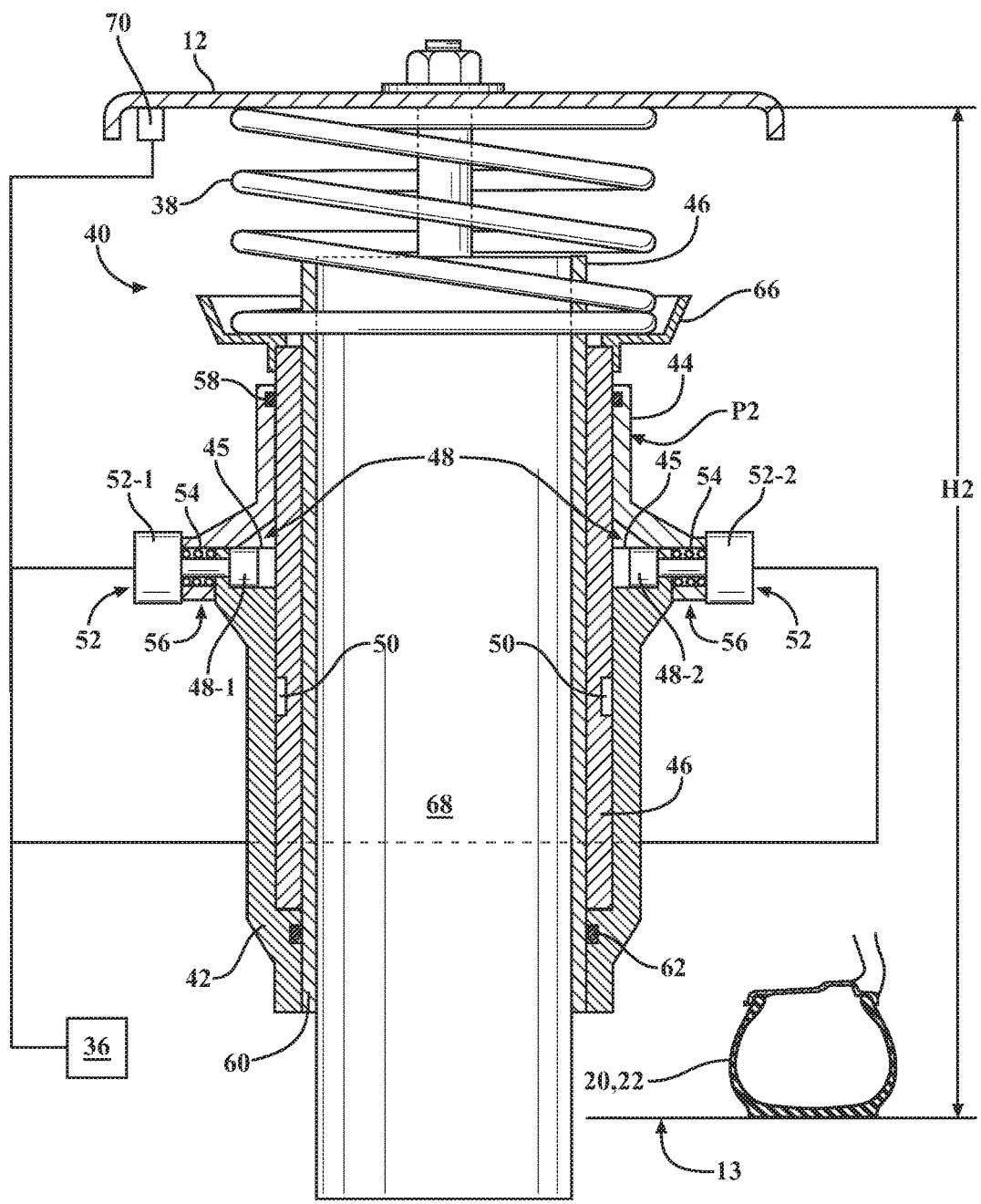
FIG. 4 is a schematic not to scale illustration of the suspension corner shown in FIG. 2, wherein the actuator is shown in a compressed position and an unlocked state.

The suspension system 24 also includes a spring 38, and an actuator 40 connected to each of the front and rear wheels 20, 22, as represented by an individual suspension corner 28 (shown in FIGS. 2-3). Depending on the operating conditions of the vehicle 10, the hydraulic actuator 40 receives pressurized fluid 35 from the pump 34. The knuckle 26 has its motion controlled in response to road input by the spring 38 and a damper 68, which cushion or dampen forces being generated at the specific wheel 20, 22 as the vehicle 10 traverses the road surface 13. Although a specific configuration of the suspension system 24 is shown in FIGS. 1-3, other vehicle suspension designs are similarly envisioned, such as another embodiment of the individual suspension corner 28 that shown in FIG. 4.

The actuator 40 selectively extends and contracts in response to a volume of the pressurized fluid 35 received from the pump 34. As the actuator 40 selectively extends and contracts, such action selectively increases and reduces the height H of the vehicle body 12 relative to the road surface 13 at the suspension corner 28. The actuator 40 includes a first housing 42 and a second housing 44 fixed to the first housing. Although the position of the first and second housings 42, 44 can be reversed, such that in the actual vehicle 10 the first housing 42 is arranged above the second housing 44, hereinafter, and solely for exemplary purposes, the first housing 42 will be referred to as the lower housing and the second housing 44 will be referred to as the upper housing.

Figure 5:
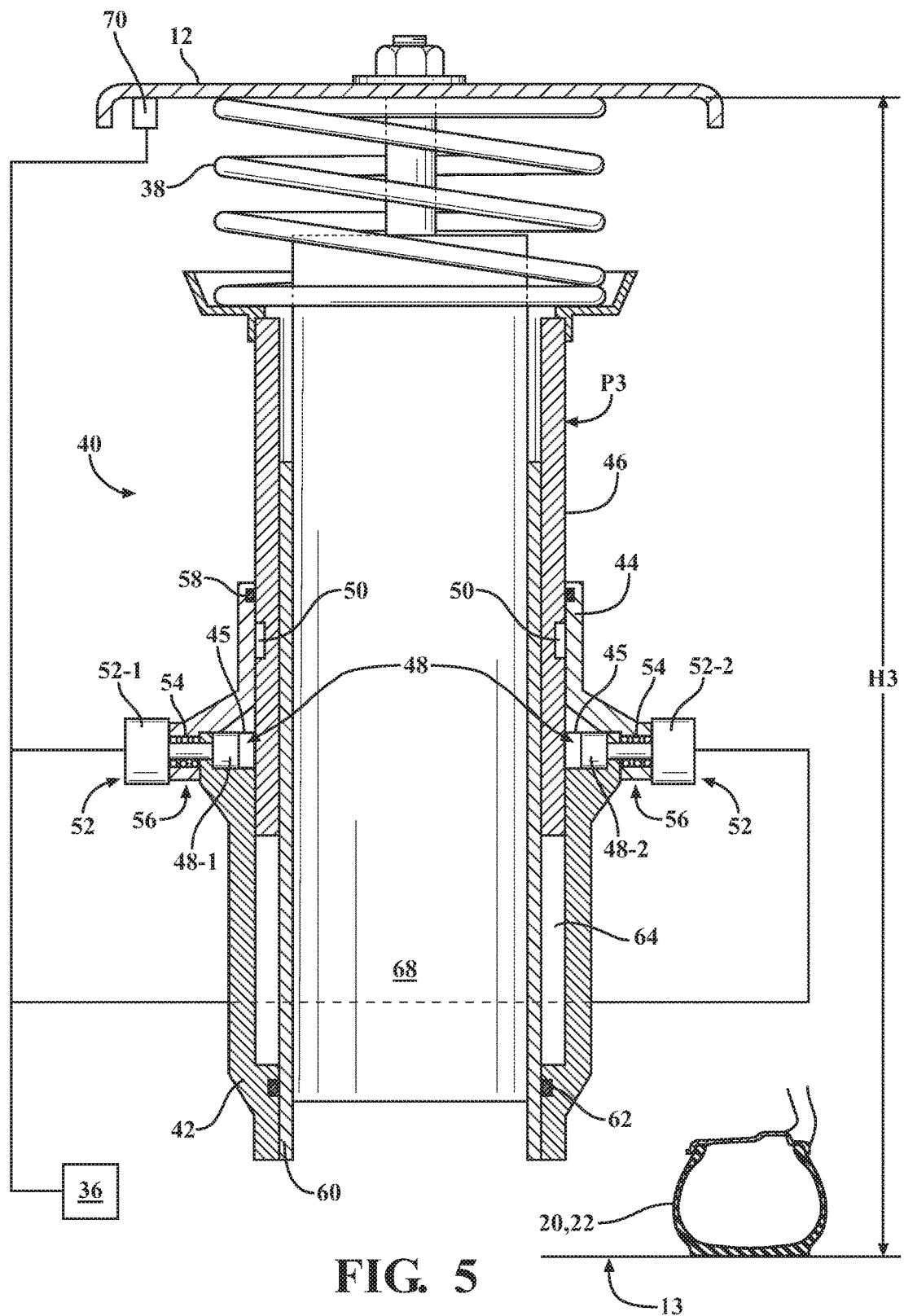
FIG. 5 is a schematic not to scale illustration of the suspension corner shown in FIG. 2, wherein the actuator is shown in an extended position and an unlocked state.

The actuator 40 also includes a piston 46 configured to translate, such as slide relative to each of the lower housing 42 and the upper housing 44. The actuator 40 additionally includes a locking device, generally indicated via numeral 48 and to be discussed in detail below, configured to engage a respective feature 50, such as a groove or a recess, on the piston 46 and thereby restrain the piston in a predetermined position P1 (shown in FIG. 3) relative to each of the lower housing 42 and upper housing 44. The restraining of the piston 46 in such a predetermined position P1 is intended to set and lock the predetermined height H of the vehicle body 12 relative to the road surface 13 at the specific suspension corner 28. The locking device 48 is also configured to disengage the feature 50 and release the piston 46 such that the height H of the vehicle body 12 can be varied as desired between minimum design height H2 (shown in FIG. 4) and maximum design height H3 (shown in FIG. 5). The predetermined position P1 of the piston 46 can be an intermediate position between minimum travel P2 (shown in FIG. 4) and maximum travel P3 (shown in FIG. 5) of the piston within a pocket 64. In turn, the predetermined position P1 of the piston 46 sets and defines an intermediate height H1 (shown in FIG. 3) of the vehicle body 12 relative to the road surface 13 at the suspension corner 28.

The actuator 40 also includes an actuation mechanism 52 configured to activate the locking device 48 to thereby restrain the piston 46 in the predetermined position P1. As shown, the locking device 48 may include a split collar having a first half-collar 48-1 and a second half-collar 48-2, each configured to engage the feature 50 on the piston 46. The actuation mechanism 52 may include a first solenoid 52-1 and a second solenoid 52-2, or any other electric, mechanical, pneumatic, or a hybrid combination device, for example, electro-mechanical, configured to selectively extend the respective first half-collar 48-1 and the second half-collar 48-2 into the feature 50 as part of a control strategy in one embodiment. The selective extension of the respective first half-collar 48-1 and the second half-collar 48-2 into the feature 50, such as by energizing the respective first and second solenoids 52-1, 52-2, restrains or locks the piston 46 in the specific predetermined position P1.

The actuation mechanism 52 may also include at least one elastic element 54, such as a return spring, configured to act counter to the respective forces of the first and second solenoids 52-1, 52-2. Although the elastic elements 54 are depicted as two individual return springs, one per each respective solenoid 52-1, 52-2, a single annular elastic element disposed around the outer circumference of the lower housing 42 and acting simultaneously on each solenoid, is also envisioned. Accordingly, in such an embodiment, the at least one elastic element 54 facilitates retraction of the respective first and second half-collars 48-1, 48-2 from the feature 50, e.g., out of the recess, to thereby release the piston 46 for unhindered movement when the respective first and second solenoids 52-1, 52-2 are de-energized.

Figure 6:
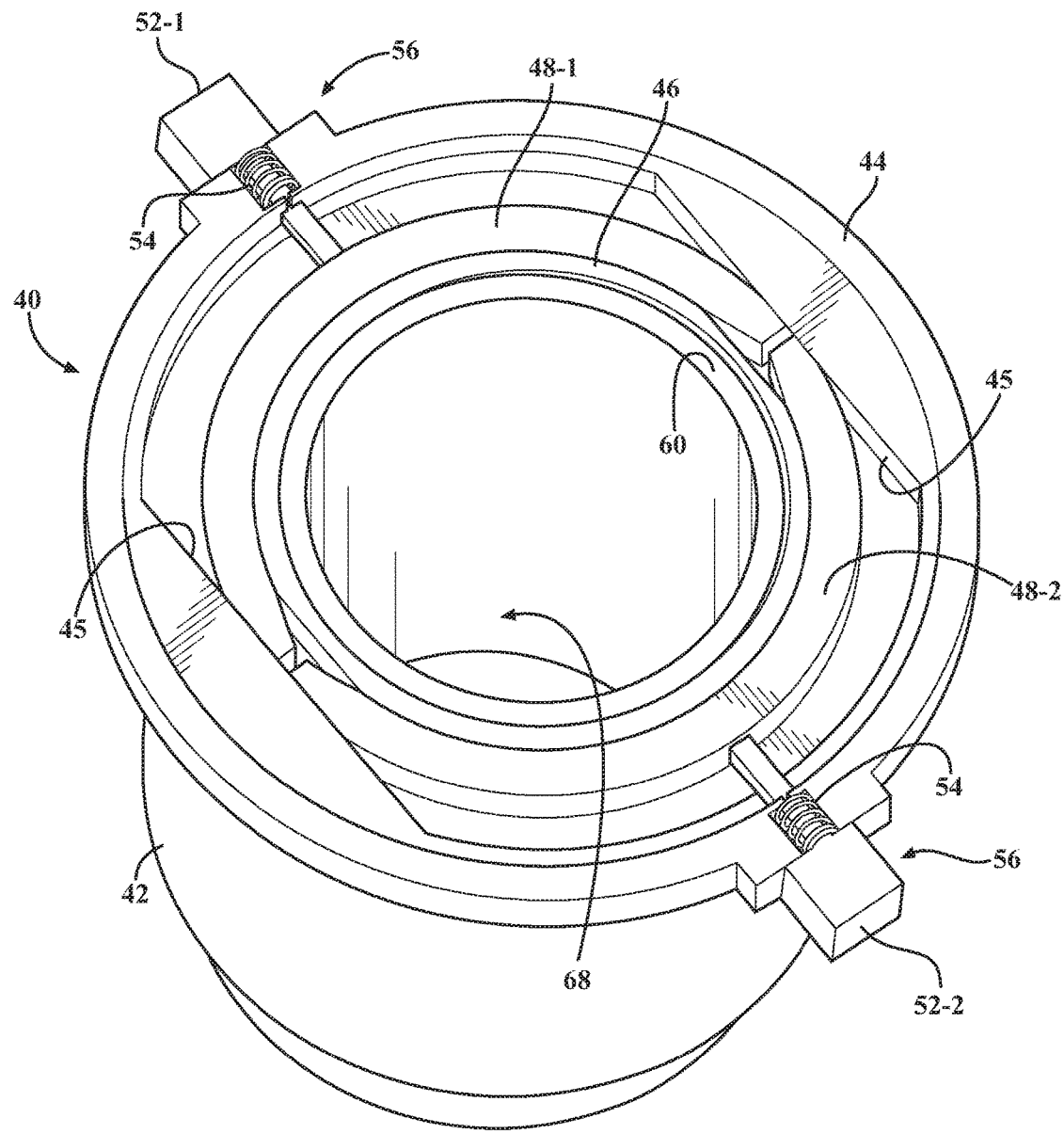
FIG. 6 is a schematic cross-sectional illustration of the actuator shown in FIGS. 2-3, depicting an actuator piston being restrained by a locking device.
Figure 7:
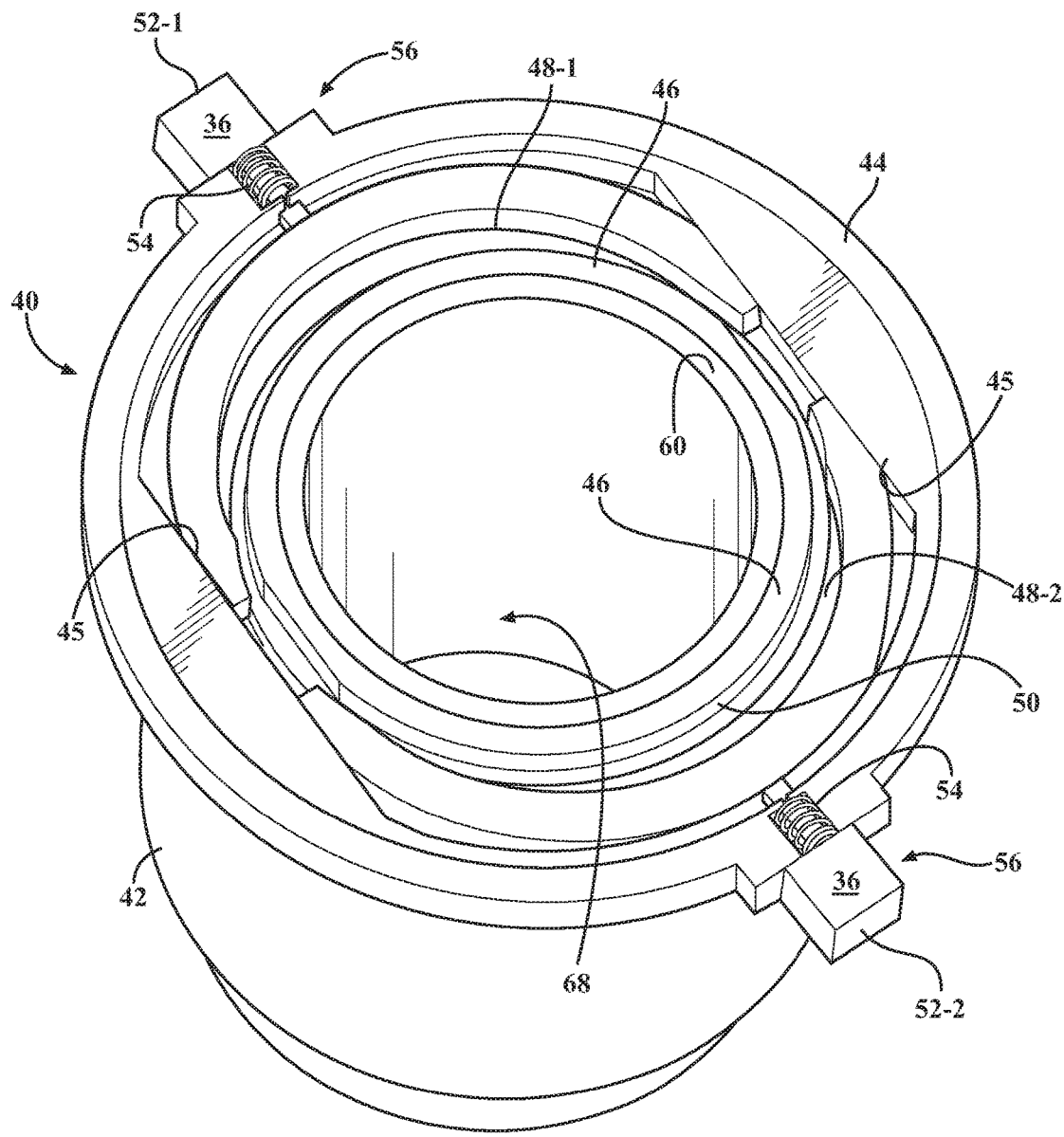
FIG. 7 is a schematic is a schematic cross-sectional illustration of the actuator shown in FIGS. 2-3, depicting the actuator piston being released by the locking device.

An opposite control strategy is also envisioned, where the forces exerted by the at least one elastic element 54 restrain or lock the piston 46 in the specific predetermined position P1. Accordingly, in such an alternative embodiment, the retraction of the respective first and second half-collars 48-1, 48-2 from the feature 50 to release the piston 46 is facilitated by energizing the respective first and second solenoids 52-1, 52-2 counter to locking forces of the respective elastic elements 54. As shown in FIGS. 6 and 7, the half-collars 48-1, 48-2 may be guided for sliding movement relative to the lower housing 42 via dedicated channels 45. The channels 45 may be defined, at least in part, by both the lower and upper housings 42, 44 (shown in FIGS. 3-5), or formed entirely in the lower housing 42 (shown in FIGS. 6-7).

The first solenoid 52-1 and the second solenoid 52-2 may each be mounted on the upper housing 44 of the actuator 40. Additionally, each of the first solenoid 52-1 and the second solenoid 52-2 may extend through the lower housing 42 at an overlapping interface 56 between the lower housing and the upper housing 44. The lower housing 42 can be fixed to the upper housing 44 and sealed at the interface 56 via any appropriate attachment means, such as via welding or complementary spiral threads (not shown). Additionally, the upper housing 44 may include a first sealing element 58 configured to fluidly seal the upper housing 44 to the piston 46.

The actuator 40 may also include a guide sleeve 60 disposed inside the piston 46 and configured to guide the piston during its movement relative to the lower and upper housings 42, 44. The lower housing 42 may include a second sealing element 62 configured to fluidly seal the lower housing to the guide sleeve 60. As shown, the lower housing 42 may include the pocket 64, bounded by the guide sleeve 60 and configured to accept the piston 46 such that the piston is permitted to slide within the pocket. The actuator 40 additionally includes a spring seat 66 configured to provide a reaction surface for the spring 38, while the damper 68 is arranged to extend through the guide sleeve 60. Although the spring seat 66 is illustrated as being arranged on the lower housing 42, nothing precludes the actuator 40 being configured such that the spring seat is arranged on the upper housing 44, and the actuator being arranged in the vehicle 10 upside-down to accommodate such an embodiment. The pressurized fluid 35 supplied to the actuator 40 will be delivered into the pocket 64 to selectively expand and contract the volume of thereof, thereby selectively increasing and reducing the height H of the vehicle body 12 relative to the road surface 13 at the respective suspension corner 28.

The vehicle 10 may include sensors 70 configured to detect the height H of the vehicle body 12 relative to the road surface 13 at individual suspension corners 28. As such, the vehicle 10 may include one such sensor 70 for each suspension corner 28. Specifically, each of the sensors 70 may be configured to sense proximity of the sensor 70 to the road surface 13. Furthermore, the controller 36 is configured to receive the signal indicative of the height H of the vehicle body 12 from each sensor 70 and regulate the actuation mechanism 52 to selectively restrain the piston 46 in the predetermined position P1 and release the piston via the locking device 48, e.g., the split collar with the first and second half-collars 48-1, 48-2. Such restraint of the piston in the predetermined position may be used to set and maintain the vehicle at a specific or default height H as a failsafe mode regardless of operational state of the pump 34.

To control operation of the vehicle suspension system 24, the controller 36 may be programmed to selectively regulate the fluid pump 34 in real time, e.g., via voltage or current commands, operating speed modulation, etc., to deliver the fluid 35 into the actuator 40 depending on the desired ride height H based on the road conditions, the speed of the vehicle 10, and the general performance expected from the vehicle by its operator. Additionally, the controller 36 may be programmed to regulate the actuation mechanism 52, e.g., actuate the first and second solenoids 52-1, 52-2, to thereby either restrain the piston 46 in the predetermined position P1 or release therefrom depending on the selected control strategy, as disclosed above. Accordingly, the suspension system 24 achieves a mechanically maintained vehicle ride height without the need to balance the pressure of fluid 35 against the load of the spring 38 and weight of the vehicle body 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body;
   a road wheel configured to maintain contact with a road surface;
   a suspension corner connecting the road wheel to the vehicle body and configured to maintain contact between the road wheel and the road surface;
   a pump configured to supply a pressurized fluid; and
   an actuator arranged at the suspension corner and configured to receive the pressurized fluid from the pump, and selectively extend and contract in response to a volume of the pressurized fluid received from the pump, to thereby selectively increase and reduce a height of the vehicle body relative to the road surface at the suspension corner;
   wherein the actuator includes:
      a first housing, a second housing fixed to the first housing, and a piston having a recess and configured to translate relative to each of the first housing and the second housing;
      a locking device including a split collar having a first half-collar and a second half-collar, each half-collar configured to engage the recess to selectively restrain the piston in a predetermined position relative to each of the first housing and the second housing, to thereby lock a predetermined height of the vehicle body relative to the road surface at the suspension corner, and release the piston; and an actuation mechanism configured to activate the locking device to thereby restrain the piston in the predetermined position.

2. The vehicle according to claim 1, wherein the actuation mechanism includes a first solenoid and a second solenoid configured to selectively extend the respective first half-collar and second half-collar into the recess to thereby restrain the piston in the predetermined position and retract from the respective first half-collar and the second half-collar to release the piston.

3. The vehicle according to claim 2, wherein the first solenoid and the second solenoid are each mounted on the second housing of the actuator.

4. The vehicle according to claim 3, wherein each of the first solenoid and the second solenoid extend through the first housing.

5. The vehicle according to claim 1, wherein the second housing includes a first element configured to fluidly seal the second housing to the piston.

6. The vehicle according to claim 5, wherein the actuator includes a sleeve disposed inside the piston, and wherein the first housing includes a second element configured to fluidly seal the first housing to the sleeve.

7. The vehicle according to claim 1, wherein the first housing includes a pocket configured to accept the piston, and wherein the piston is configured to slide within the pocket.

8. The vehicle according to claim 7, wherein the predetermined position of the piston is an intermediate position between minimum and maximum travel of the piston within the pocket, and wherein the predetermined position of the piston defines an intermediate height of the vehicle body relative to the road surface at the suspension corner.

9. The vehicle according to claim 1, further comprising:
a sensor configured to detect the height of the vehicle body relative to the road surface at the suspension corner; and
a controller configured to receive the signal indicative of the height of the vehicle body and regulate the actuation mechanism to selectively restrain the piston in the predetermined position and release the piston via the locking device.

10. An actuator comprising:
a first housing;
a second housing fixed to the first housing;
a piston having a recess and configured to translate relative to each of the first housing and the second housing;
a locking device including a split collar having a first half-collar and a second half-collar, each half-collar configured to engage the recess to selectively restrain the piston in a predetermined position relative to each of the first housing and the second housing and release the piston; and
an actuation mechanism configured to activate the locking device to thereby restrain the piston in the predetermined position.

11. The actuator according to claim 10, wherein the actuation mechanism includes a first solenoid and a second solenoid configured to selectively extend the respective first half-collar and second half-collar into the recess to thereby restrain the piston in the predetermined position and retract from the respective first half-collar and the second half-collar to release the piston.

12. The actuator according to claim 11, further comprising at least one elastic element configured to facilitate retraction of the first and second half-collars out of the recess to thereby release the piston.

13. The actuator according to claim 11, wherein the first solenoid and the second solenoid are each mounted on the second housing.

14. The actuator according to claim 13, wherein each of the first solenoid and the second solenoid extend through the first housing.

15. The actuator according to claim 10, wherein the second housing includes a first element configured to fluidly seal the second housing to the piston.

16. The actuator according to claim 15, further comprising a sleeve disposed inside the piston, and wherein the first housing includes a second element configured to fluidly seal the first housing to the sleeve.

17. The actuator according to claim 10, wherein the first housing includes a pocket configured to accept the piston, and wherein the piston is configured to slide within the pocket.

18. The actuator according to claim 17, wherein the predetermined position of the piston is an intermediate position between minimum and maximum travel of the piston within the pocket.

* * * * *